Figure 1:
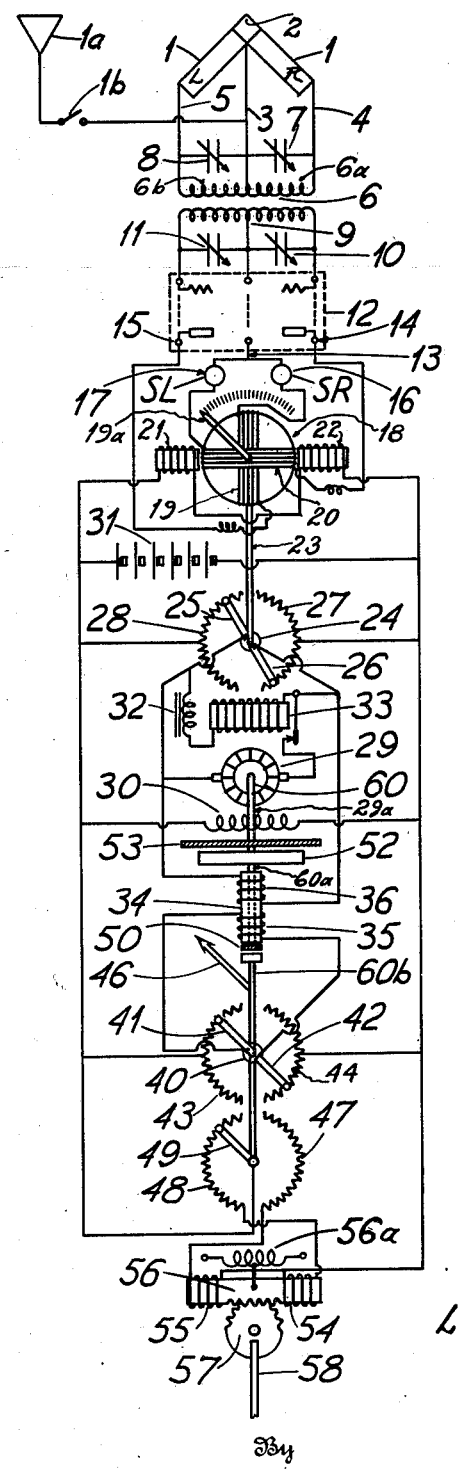

Aug. 25, 1936.  L. A. WARNER  2,051,974
RADIO NAVIGATOR
Filed June 17, 1935  2 Sheets-Sheet 1

Inventor
Louis A. Warner

Aug. 25, 1936.     L. A. WARNER     2,051,974
RADIO NAVIGATOR
Filed June 17, 1935      2 Sheets-Sheet 2
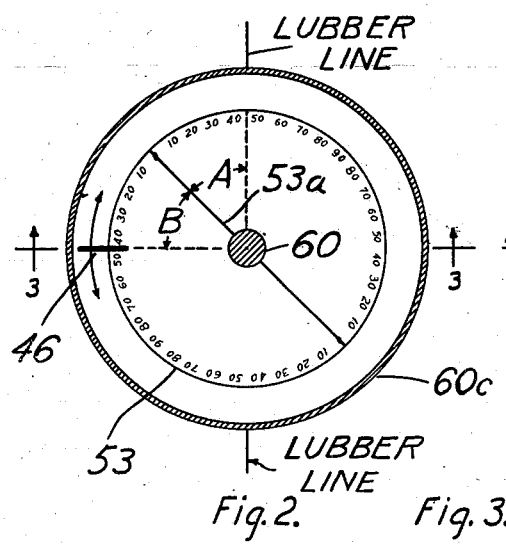
Fig. 2.   Fig. 3.
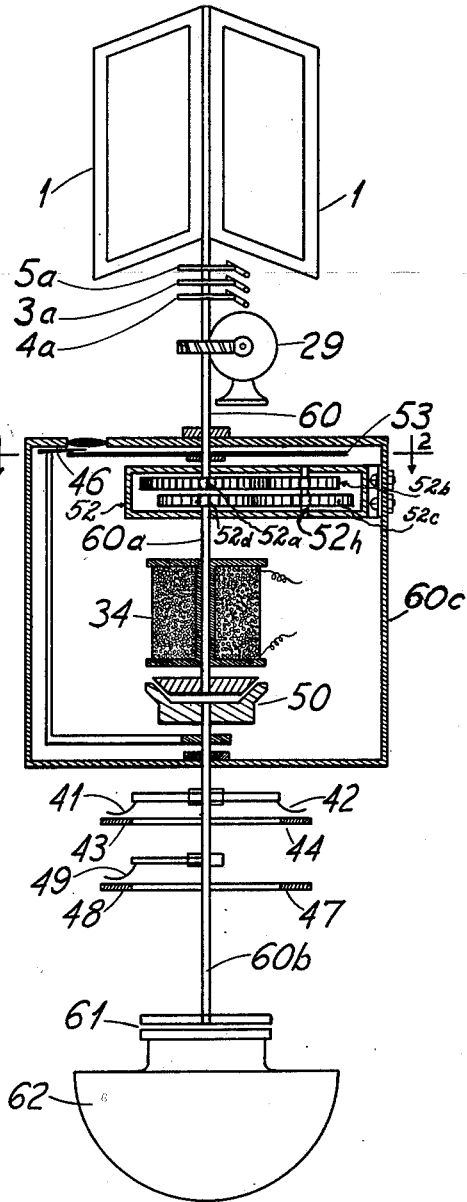
Inventor
Louis A. Warner
By Ben J. Chromy
Attorney Patented Aug. 25, 1936

2,051,974

UNITED STATES PATENT OFFICE 2,051,974

RADIO NAVIGATOR

Louis Allen Warner, Baltimore, Md.

Application June 17, 1935, Serial No. 27,098

10 Claims. (Cl. 172—282)

This invention relates to radio navigating apparatus generally. More particularly this invention relates to radio apparatus for receiving signaling energy on board a vessel to determine direction, bearing and drift with respect to a transmitting station for the purpose of determining and compensating for drift from a predetermined course and for navigating the vessel.

An object of this invention is to provide a radio receiver to moving vessels, such as, ships and aircraft for obtaining continuous radio bearings.

Another object of this invention is to provide a radio receiver to moving vessels, such as, ships and aircraft, to cooperate with a magnetic or similar compass in determining drift or tendency for drift of the moving vessel from a predetermined course and for automatically compensating therefor.

Still another object of this invention is to provide a continuous drift indicator to vessels, such as, ships and aircraft.

A further object of this invention is to provide a direct reading "crab angle" indicator to vessels, such as, ships and aircraft.

A still further object of this invention is to provide a radio receiving system for ships, vessels, aircraft and the like, for automatically indicating the absolute direction sense, and for controlling the course or movement of the ship in accordance therewith.

Other and further objects of this invention will be apparent to those skilled in the art to which it relates from the following specification and the claims.

In accordance with this invention I provide a system for navigating vessels, such as, watercraft, aircraft and land vehicles, by radio. The system of my invention employs a radio receiver which is adjusted to receive signaling energy from a predetermined station. Certain ones of the controls of the vessel being navigated, are connected to the output of the radio receiver to be controlled in accordance with signaling energy being received.

To accomplish this I provide a rotatable loop or closed antenna system, including two angularly disposed loops mounted on a shaft, connected to separate amplifying apparatus for controlling one or more indicators and/or electric controllers which are mechanically connected to the antenna shaft for changing the angular position of the rotatable loop antenna system in accordance with the signals received. A scale is provided adjacent to the rotatable shaft and geared thereto to rotate in predetermined relation with respect to the loop antenna system for the purpose of indicating the drift of the vessel being navigated, from a predetermined course, and also to indicate the crab angle.

Proper provision is also made to alter the adjustment of or register the effect of the tendency of the vessel to drift, upon a navigating compass for the purpose of compensating for drift or the tendency to drift, and steer the vessel on a direct route or course.

These and other features of this invention will be apparent from the following detailed description of an embodiment of this invention and the drawings in which, briefly, Fig. 1 illustrates a schematic diagram of connections of the radio receiving and control apparatus of my invention; Fig. 2 is a detail view of the drift and crab angle indicators; and Fig. 3 illustrates details of certain mechanical features of the radio receiving and control apparatus of my invention.

Referring to Figs. 1 and 3 in detail, reference numeral 1 designates two loop antennas arranged at an angle to each other and having a common conductor at the apex 2 or leading portion thereof, which points in the direction from which signaling energy is received. These loops are mounted on a rotatable shaft as illustrated in Fig. 3 and the connecting leads 3, 4 and 5 shown in Fig. 1 include the slip ring and brush contacts 3a, 4a and 5a to permit the loop antennas to be rotated with respect to the tuning condensers 7 and 8 and the transformer 6.

A non-directional sensor antenna 1a, including either a vertical conductor or any other type of substantially non-directional signal pick-up, is connected to the lead 3 by a switch 1b for the purpose of altering the signal receiving characteristics of each of the loops from a bi-lateral pattern to a heart-shaped or cardioidal pattern.

Each section of the loops is tuned by a separate condenser 7 and 8, respectively. These condensers 7 and 8 are connected across the sections 6a and 6b, respectively, of the split primary of transformer 6. The secondary 9 of this transformer is likewise split and condensers 10 and 11 may be employed to tune these sections separately. It is, of course, obvious and desirable to gang these condensers in any conventional manner, so that they may be manipulated as a unit by one control.

An amplifier 12 of a type employing a circuit similar to the conventional push-pull or back to back is employed for amplifying the signals received on each loop separately. This amplifier also includes suitable signal detectors which may be of any conventional type, such as, electron discharge devices, crystals and the like. An audio frequency amplifier of one or more stages also may be employed for amplifying each signal.

The output of the amplifier is connected to the indicator 18 which employs two crossed-coil windings 19 and 20 movable in a magnetic field set up between the pole pieces of the solenoids 21 and 22, which are energized from the battery 31. The lead 13 which is the common lead of the amplifier, in that it is connected to the cathode circuits thereof, is connected through the lamps or head phones 16 and 17 to both of the windings 19 and 20. The leads 14 and 15 are connected to the other ends of each of these windings 19 and 20 as shown.

As the vessel carrying the apparatus of my invention, including the foregoing receiving apparatus proceeds directly toward a given radio transmitting station the two loop antennas 1 receive substantially the same amount of signal energy and consequently the indicators 16 and 17 indicate a balanced reception condition. The needle 19a, mounted on the galvanometric movement including the coils 19 and 20 maintains a position substantially in the center of the scale associated therewith. If, however, the position of the loop 1 is changed and these loops receive an unbalanced amount of energy, that is, if the loop R receives more signal energy than the loop L, the indicator 17 is energized to a greater extent than the indicator 16, simultaneously the pointer 19a of the moving coil indicator is moved to the left and indicates on the scale the extent of the deviation from the true course to the transmitting station. Likewise, when the loop L receives more signal energy than the loop R, the indicator 16 is energized more than the indicator 17 and the pointer 19a swings to the right.

A shaft 23 of insulating material, is connected to the moving coils 19 and 20 for the purpose of moving the contactors 25 and 26, which are held together by a block of insulating material 24, over the semi-circular resistance units 27 and 28. The midpoints of these resistance units are connected to the terminals of the battery 31.

The motor armature 29 is energized through the resistances 27 and 28 and the extent of the energization thereof depends upon the position of the contact arms 25 and 26, increasing until the contactors reach the midpoints of the resistances adjacent to the points connected to the leads from the battery 31.

A relay 33 is connected to the contactors 25 and 26 and the winding 36 of the electromagnetic clutch 34 is also connected to these contactors. In practice it is necessary that the electromagnetic clutch 34 operate the clutch mechanism associated therewith before the relay 33 closes the circuits between the battery 31 and the motor 29. A choke coil 32 is connected in series with the relay 33 to act as a current delay device to delay the building up of the electric current to full value through the circuit of the relay 33 for an instant after the circuit of this relay winding is closed. This permits the delaying of the closing of the motor circuit, controlled by the relay 33, a sufficient length of time to enable the clutch solenoid 34 to disengage the rudder control.

The electromagnetic clutch 34 is provided with two windings 35 and 36. Winding 36 is connected to the movable contactors 25 and 26 and winding 35 is connected to the contactors 41 and 42 which are mounted on the member 40, of insulating material, and are rotatable by the shaft section 60b which is connected to the armature 29 of the motor through the clutch plates 50, the shaft 60a passing through the solenoid of the electromagnetic clutch 34, the gears 52 and the armature shaft 29a. The radio card 53, described in further detail in subsequent paragraphs hereof, is mounted on shaft 60 and rotated by the motor 29 through a definite angle at a certain rate, however, the shaft 60a, which adjusts the angular position of the "crab" angle pointer 46 and the contactors 41, 42 and 49 through the electromagnetic clutch 34, is rotated by the motor 29 through an angle equal to twice the angle through which the radio card is rotated. This is accomplished by employing a set of two to one ratio gears 52 and is an essential feature of my invention employed for the purpose of more accurately navigating the vessel.

Two substantially semi-circular resistance elements 43 and 44 are associated with the contactors 41 and 42. Connections are provided between the mid-points of these elements 43 and 44 and the source of current supply 31. The common connection of the solenoids 54 and 55 is connected to the resistance element 44 and the contactor 49, associated with the resistance elements 47 and 48, is connected to the resistance 43. The resistances 43 and 44 are employed to control the magnitude of energization and polarity of the winding 35 and the resistances 47 and 48 are employed to control the magnitude of energization and polarity of the rudder controlling solenoids 54 and 55. These solenoids 54 and 55 are provided with an armature 56 which is geared to the pinion 57 for controlling the rudder 58. The central portion of the armature 56 may be formed with suitable teeth thereon for meshing with teeth of the member 57 or, any other suitable type of drive or connection between the solenoid armature and the rudder may be employed. A spring 59 is employed to keep the rudder in normal position or to return it to this position when the solenoids 54 and 55 are de-energized.

The loop antennas 1 are mounted on the shaft 60 as illustrated in Fig. 3. This shaft is rotated by the motor 29 and also carries the radio card 53. A set of 2 to 1 ratio gears 52 including the gears 52a, 52b, 52c and 52d, all enclosed in the casing 52e. The gears 52b and 52c are both fixedly mounted on the shaft 52h which is journaled in the top and bottom of the casing, as illustrated in Fig. 3. These gears are interposed in the motor actuated shaft 60 for the purpose of rotating the shaft section 60a through twice the angle through which the section 60 is rotated and in the same direction. The electromagnetic clutch 34 is positioned in such a way that the windings thereof encircle the lower portion of the shaft 60a and are adjacent to the clutch plates 50. These clutch plates are preferably of magnetic material so that the lower one of these plates is pulled upward when the clutch solenoids are properly and sufficiently energized, and the plates of the clutch caused to engage each other for simultaneous rotation. It is of course apparent that a multiple plate clutch may be employed and that the faces of the plates may be coated with such materials, as rubber and the like to facilitate transmission of power through the clutch without objectionable slipping.

The pointer 46 is carried by the shaft section 60b and is swung over the scale 46a. At the lower end of the shaft section 60b is provided a clutch 61 for connecting the shaft section to the gyroscope compass 62. This compass is of conventional design and is accordingly not illustrated further.

Simultaneously as the clutch plates 50 are caused to engage by the operation of the electromagnetic clutch 34, the shaft section 60b is lifted in a vertical direction and the wiping contactors 41, 42 and 49 are lifted out of electrical contact with the resistance elements adjacent thereto. The clutch discs 61 of the gyroscope compass 62 are also disengaged and the shaft section 60b taken out of the control of the gyroscope compass. The contactors 41, 42 and 49 are thus arranged with the associated apparatus in such a way that they may be adjusted while out of contact with the resistance units 43, 44, 47 and 48.

The operation of my invention in its preferred form is as follows:

Under conditions of no drift when the vessel is proceeding in the direction of the radio signal the zero center indicating instrument, employing coils 19 and 20, stands at zero and all control circuits mechanically coupled thereto are in a neutral position. With a cross-wind, for example, from the left, producing a thirty degree drift away from the course to the right, the energy being picked up in the loop R will exceed that in the loop L. These energies being separately detected and amplified, produce in the output of the amplifier 12 a larger amount of current flow through the coil 20 than through the coil 19. The difference in current values through these coils moves the needle 19a to the left, indicating the direction of the radio transmitter and at the same time moving the shaft 23 and contactor arms 25 and 26, which are mounted on the shaft. The contactor arms move over the split Wheatstone bridge resistances 27 and 28, and energize the control circuits as follows:

The direction of rotation of the contactors 25 and 26 determines the polarity of the current delivered to the brushes of the armature 29 and thereby controls the direction of rotation of said armature. The distance of travel over the resistances of these contactors arms also determines the amount of current supplied to the armature, so that a larger aberration will produce a quick response of the controls and a small aberration produces a slow movement thereby preventing excessive movement in the resistance contactors and oscillation of the latter.

Before the motor 29 starts rotating, the plates 50 of the clutch 34 are brought into an engagement and the plates 61 of the gyroscope compass are disconnected. The rudder control is thus left as it was prior to the selection of the course and the vessel is prevented from swinging around a vertical axis, during the short interval that the new course is being selected. The contactors 41, 42 and 49 are brought out of contact with the resistance units associated therewith, simultaneously as the electromagnetic clutch 34 is properly energized and the position of these contacts is thus adjusted while they are electrically inactive or out of circuit.

Relay 33 operates to close the circuit of the motor armature 29, which rotates the loops in the proper direction. The loops are thus swung until their index points directly toward the radio transmitter and the energy picked up by the loop R diminishes at the same rate as the energy picked up by the loop L increases, until the index of the loops points towards the station, at which time both loops receive the same amount of energy.

This action, of course, brings the needle of the zero center instrument back to zero and causes the circuits to the armature of the motor to be interrupted, thereby stopping the rotation of the loops. The electromagnetic clutch is also de-energized.

While the loops are being swung to the on-bearing position, that is 30° to the left, the corrector contactors 41, 42 and 49, being geared to loop shaft at a ratio of 2 to 1, are swung 60° to the left. The "crab" angle indicator 46 moving in unison with the corrector contactors also is rotated 60° to the left. When the loops reach the on-bearing position, electromagnetic clutch 34 is de-energized and released, preventing any further rotation of either the course corrector contactors or the "crab" angle indicator. These are thereafter held fixed or adjusted by the directive force of either a magnetic or gyroscopic compass 62, and the rudder controlled electromagnetically.

The vessel now proceeds to the left until it reaches the new course, however, the loops swing with the plane, and therefore tend to point away from the station giving an R or right deviation reading on the zero-center instrument. The motor 29 is thus caused to rotate in the opposite direction and bring the loops back to "on-bearing" position. It will be seen that some arrangement must be made to prevent the electromagnetic clutch 34 from operating at this point since its operation would prevent the vessel from turning and would reconnect the course corrector at an improper interval.

This is accomplished by the biasing circuit 35 of the clutch 34. This biasing circuit is energized through the resistance elements 43 and 44 which are connected into circuits by the contactors 41 and 42. These contactors are moved simultaneously as the loops are rotated to "on-bearing" position.

The contactor arms 41 and 42 feed a current through the winding 35 of the electromagnetic clutch, in the same direction as the current through the other winding 36, and remain on until the vessel reaches the corrected course. When the loops are rotated to the left, the magnetic force produced in the electromagnetic clutch by the biasing circuit is additive and has no decided effect on the holding of the clutch, inasmuch as the biasing winding and the current thereto is not sufficient to operate the clutch. However, when the "on-bearing" point is reached by the loop, and the course of the vessel reset, the clutch 34 is released by the cut-off of the current through the main winding 3y. The vessel is started swinging to the left in order to bring it on the new course, through the operation of the solenoids 54 and 55, the resistance 48 and contactor 49.

The balance in the amount of energy received by the loops is disturbed as the vessel is swung to the left with the result that the zero-center instrument is swung to the right and current is fed to the motor armature and the winding 36 in the opposite direction. The effect of the biasing current flowing through the winding 35 is now more marked, inasmuch as the current through this winding is opposite to that through the winding 36, and partly neutralizes the magnetic effect of the latter winding so that insufficient force is produced to operate the clutch.

The biasing circuit, therefore renders the clutch inoperative during the back swing of the loops allowing the rudder control circuit to function and bring the plane upon the correct course, and prevents the resetting of the course during this interval. When the plane reaches the corrected course the biasing circuit is interrupted. Further operation of the instrument, in either direction, may then be obtained.

In Fig. 2 is shown a sectional view through the indicator card case 60c. The card 53 is carried by the shaft 60 and is provided with different angular calibrations in each of the four quadrants thereof so that the angle between the zero line 53a and the lubber line, that is, the angle A, and the angle B between the zero line 53a and the pointer of the crab angle indicator 46 are equal. The crab angle indicator 46 is geared at a ratio of 2 to 1 to the motor section of the shaft 60, which rotates the card 53 and, therefore, the angle indicated by the crab angle indicator, with respect to the lubber line, is always twice the angle of drift indicated by the zero line 53a.

It will be observed from the foregoing specification that I have described an embodiment of this invention in considerable detail, however, I do not desire to limit this invention to those exact details except insofar as they may be defined by the appended claims.

What I claim and desire to secure by Letters Patent is as follows:

1. A radio navigator for navigating vessels comprising a pair of antennas, means for rotating said antennas, a pair of signal receivers connected to said antennas for independently receiving signaling energy intercepted by each of said antennas, means connected to said signal receivers for indicating when the loop antennas intercept substantially equal signal intensities, a motor for rotating said antennas, means for energizing said motor when said antennas intercept signal energy of unequal intensities and for de-energizing said motor when said antennas are rotated to a position to intercept substantially equal signal intensities, means including electrical means for controlling the steering of the vessel being navigated, means for adjusting said electrical means when said motor is energized for controlling the steering of the vessel being navigated in accordance with the operation of said signal receivers.

2. A radio navigator for navigating vessels comprising a pair of loop antennas disposed at an angle to each other, signal receiving means connected to said loop antennas, an electromagnetic device connected to said signal receiving means for indicating the magnitude of the difference in signal energy intercepted by said pair of loop antennas, means for rotating said loops, means connected to said electromagnetic device for energizing said loop-rotating means when the signal reception over said loops is unbalanced and for de-energizing said loop-rotating means after said loops are rotated and balanced reception is obtained, means for steering the vessel being navigated, electrical means for controlling said steering means and means for adjusting said electrical means in accordance with the adjustment of said loop-rotating means for controlling the steering of said vessel in accordance with the operation of said signal receiving means.

3. A radio navigator for navigating vessels comprising a pair of loop antennas, means for rotating said antennas, signal receiving devices connected to each of said loop antennas, an electromagnetic indicating and control device having a pair of windings, said windings being connected to said signal receiving devices for indicating balanced or unbalanced signal pick-up by said loop antennas, means coupled to said electromagnetic device for controlling the energization of said first-mentioned means, means for steering the vessel being navigated, electrical means for controlling said steering means, means for controlling the energization of said electrical means and means for adjusting said last-mentioned means in accordance with the operation of said signal receiving devices.

4. A radio navigator for navigating vessels comprising a pair of rotatable loops, signal receiving devices connected to each of said loops, an electromagnetic indicating and control device having a pair of windings, means for impressing signal energy from one of said loops on one of said windings and means for impressing signal energy from the other of said loops on the other of said windings, a motor for rotating said loops, variable resistance means controlled by said electromagnetic device, connections between said variable resistance device and said motor, an electromagnetic clutch having a pair of windings, connections between one of said clutch windings and said variable resistance means, a second variable resistance device connected to the other of said clutch windings to control the energization thereof, electromagnetic rudder control for the vessel being navigated, variable means for controlling the energization of said electromagnetic rudder control, a shaft connected to said clutch for adjusting said last-mentioned variable means and said second variable resistance, shaft means connected to said clutch and said motor for adjusting said first shaft in accordance with the operation of said signal receiving devices.

5. A radio navigator for navigating vessels comprising a pair of directional antennas, a shaft means for carrying and rotating said antennas, signal receiving devices connected to each of said antennas, an electromagnetic indicating and control device having a pair of windings, means for impressing signal energy from one of said antennas on one of said windings and means for impressing signal energy from the other of said antennas on the other of said windings, a motor connected to said shaft means for rotating said antennas, variable resistance means mechanically controlled by said electromagnetic device, connections between said variable resistance means and said motor, means for indicating drift from a predetermined course of the vessel being navigated, means for supporting said drift indicating means on said shaft means, a two to one ratio gear system connected to said shaft means, a crab angle indicator connected to said shaft means to be rotated through twice the angle through which said drift indicator is rotated, an electromagnetic clutch carried by said shaft means, means for steering the vessel being navigated, adjustable electrical means for controlling the energization of said steering means, means for connecting said electrical means to said clutch for adjusting said electrical means in accordance with the operation of said signal receiving devices.

6. A radio navigator comprising a pair of loop antennas disposed at an angle with respect to each other, means for rotating said antennas, signal receiving apparatus connected to each of said loop antennas, a motor for rotating said loop antennas, means for energizing said motor when unequal magnitudes of signal energy are intercepted and for disconnecting said motor when said loops receive substantially equal amounts of signaling energy, means for indicating drift of the vessel being navigated from a predetermined course, means for supporting said drift indicating means on said shaft, crab angle indicating means and means for rotating said crab angle indicating means substantially through twice the angle through which said drift indicator is rotated.

7. A radio navigational control, comprising a rotatable directional antenna system, a shaft for rotating said antenna system, means for controlling the rotation of said antenna system for maintaining said system pointing in the direction of a predetermined station, a calibrated card attached to said shaft to be rotatable therewith for indicating the drift angle with reference to a predetermined lubber line, a two to one gearing connected to said shaft, an indicator attached to said gearing to be rotatable through twice the angle as said card in the same direction for indicating the crab angle.

8. A radio navigator comprising a pair of loop antennas disposed at an angle with respect to each other and adapted to be carried by a vehicle, signal receiving apparatus connected to each of said loop antenas, a motor for rotating said loop antennas, means for energizing said motor when unequal magnitudes of signal energy are intercepted and for disconnecting said motor when said loops receive substantially equal amounts of signaling energy, means for indicating drift of the vehicle from a predetermined course, means for supporting said drift indicating means on said shaft, crab angle indicating means, means for rotating said crab angle indicating means substantially through twice the angle through which said drift indicator is rotated, means for steering the vehicle, electrical means for controlling said steering means, means for controlling the energization of said electrical means, said last means being coupled to said crab angle rotating means, and means for adjusting said last-mentioned controlling means in accordance with the operation of said signal receiving devices.

9. A radio navigational control, comprising a rotatable directional antenna system adapted to be carried by a vehicle, means for controlling the rotation of said antennna system for maintaining said system pointing in a predetermined direction with respect to a selected station, a calibrated card with said antenna system for indicating the drift angle with reference to a predetermined lubber line of said vehicle, a crab angle indicator, and means for rotating said crab angle indicator through an angle substantially greater than the angle through which said drift indicator is rotated for indicating the crab angle of said vehicle.

10. A radio navigator for navigating vessels comprising a rotatable directional antenna system adapted to be carried by a vehicle, signal receiving means connected to said antenna system, means for rotating said antenna system for maintaining said system pointing in a predetermined direction with respect to a selected station, means for steering the vehicle being navigated, electrical means for controlling said steering means and means for adjusting said electrical means in accordance with the adjustment of said antenna system rotating means for controlling the steering of said vessel in accordance with the operation of said signal receiving means.

LOUIS ALLEN WARNER.